United States Patent [19]

Fish et al.

[11] Patent Number: 5,040,652

[45] Date of Patent: Aug. 20, 1991

[54] CYLINDRICAL AND PERMUTATION LOCK ARRANGEMENTS WITH CLUTCH

[75] Inventors: Aaron M. Fish, Hampstead; Alexander Branover, St. Laurent; Zgorzak Leszek, Montreal, all of Canada

[73] Assignee: Ilco Unican Inc., Montreal, Canada

[21] Appl. No.: 349,358

[22] Filed: May 9, 1989

[30] Foreign Application Priority Data

May 12, 1988 [CA] Canada .................................. 566657

[51] Int. Cl.⁵ ...................... E05B 13/10; F16D 43/208

[52] U.S. Cl. .................................... 192/56 R; 70/189; 70/218; 70/386; 70/422; 70/472; 192/71; 464/35

[58] Field of Search ...................... 192/71, 107 T, 108, 192/56 R; 70/218, 222, 223, 386, 188, 189, 472, 422; 292/252, DIG. 27; 464/35

[56] References Cited

U.S. PATENT DOCUMENTS

| | | | |
|---|---|---|---|
| 1,611,940 | 12/1926 | Ohmer | 70/422 |
| 1,671,521 | 5/1928 | Fisher | 464/35 X |
| 1,899,996 | 3/1933 | Sullivan | 70/222 |
| 1,910,125 | 5/1933 | Root | 464/39 X |
| 2,366,841 | 1/1945 | Dodge | 464/39 X |
| 2,544,809 | 3/1951 | Stanley | 192/56 R |
| 2,885,918 | 5/1959 | Allimann | 192/56 R |
| 3,040,556 | 6/1962 | Rosenhagen | 70/306 |
| 4,679,420 | 7/1987 | Yang | 70/222 X |
| 4,773,240 | 9/1988 | Foshee | 70/222 |
| 4,786,271 | 11/1988 | Menn | 464/35 X |
| 4,854,143 | 8/1989 | Corder et al. | 70/218 |
| 4,941,697 | 7/1990 | Fan | 292/359 X |

FOREIGN PATENT DOCUMENTS

| | | | |
|---|---|---|---|
| 15816 | of 1915 | United Kingdom | 192/56 R |

*Primary Examiner*—Lloyd A. Gall

*Attorney, Agent, or Firm*—Fleit, Jacobson, Cohn, Price, Holman & Stern

[57] ABSTRACT

A permutation lock chamber has a chamber shaft extending therethrough which is held against rotation when the chamber is in a locked condition and which is rotatable when the chamber is in an unlocked condition. The chamber shaft is connected to the shaft of an outer door handle through a clutch. When the chamber is in its unlock condition and the outer door handle is rotated, the clutch engages and the chamber shaft rotates with the outer door handle shaft. When the chamber is in its locked condition and the outer door handle is rotated, the clutch slips to permit rotation of the outer door handle shaft without rotation of the chamber shaft.

3 Claims, 5 Drawing Sheets

CYLINDRICAL AND PERMUTATION LOCK ARRANGEMENTS WITH CLUTCH

BACKGROUND OF THE INVENTION

1. Field of the Invention

The present invention relates to improvements in cylindrical lock arrangements. The invention also relates to improvements in permutation lock arrangements.

Some of the uses of such cylindrical lock arrangements provide privacy lock-out systems. With a cylindrical lock arrangement, this can be provided by a mechanism which is activated by a push-button on the inside door knob as will be further described below. The present application is partially directed at novel lock-out systems.

2. Description of Prior Art

With permutation lock arrangements, of the type as described for example in U.S. Pat. No. 3,040,536, Rosenhagen, June 26, 1962, the shaft of the outside door knob is connected to the shaft of the permutation lock chamber. The shaft of the chamber will rotate, thereby permitting rotation of the outside door knob, only when the correct combination of the permutation lock has been punched in. Often, when the incorrect combination is inserted, so that the knob will not rotate, the user will apply excess force to the outside door knob to force the chamber shaft to rotate. This can cause damage to the chamber. It would therefore be desirable to provide means for permitting the outside door knob to rotate, under such conditions, without transmitting the rotating force to the chamber shaft.

With permutation locks, it becomes necessary, from time to time, to change the combination. It would therefore be desirable to provide a cover which is easily removable by an adult, but which would present difficulty for a child to remove.

SUMMARY OF INVENTION

It is therefore an object of the invention to provide novel lock-out systems for cylinder locks.

It is a further object of the invention to provide clutch means between a door knob shaft and the shaft of a chamber of a permutation lock which permits rotation of the chamber shaft with the door knob shaft when the chamber shaft is not held against rotation, and which permits rotation of the door knob shaft, without the chamber shaft, when the chamber shaft is held against rotation.

It is a still further object of the invention to provide an improved clutch means.

It is a still further object of the invention to provide an easily removable cover arrangement for locks or the like.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
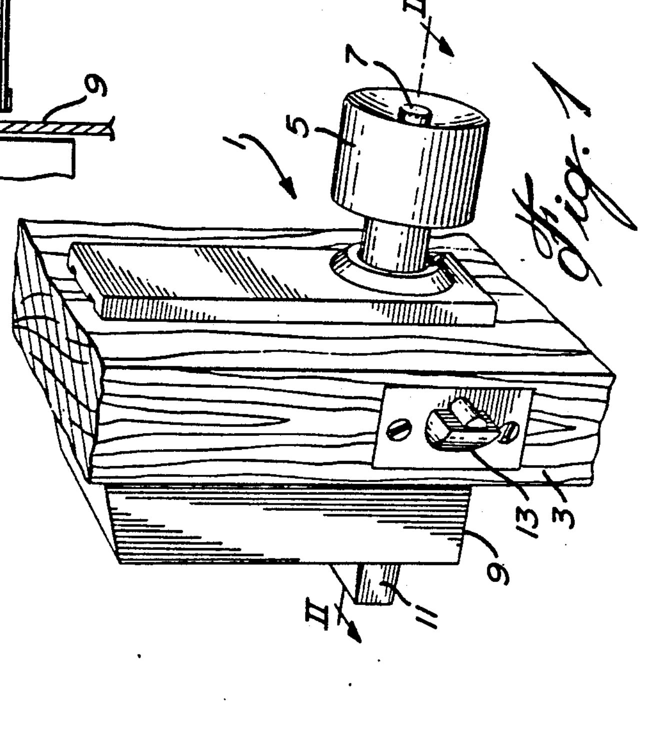
FIG. 1 is a perspective view of an arrangement in which all of the above described inventive features may be incorporated.

Turning now to FIG. 1, a lock arrangement, illustrated generally at 1, is mounted on a door 3 and includes an inner door knob/handle (hereinafter referred to as knob 5), having a centrally located push-button 7, and a push-button lock 9 having an outer door knob 11. The latch 13 extends through an edge of the door 3.

Figure 2:
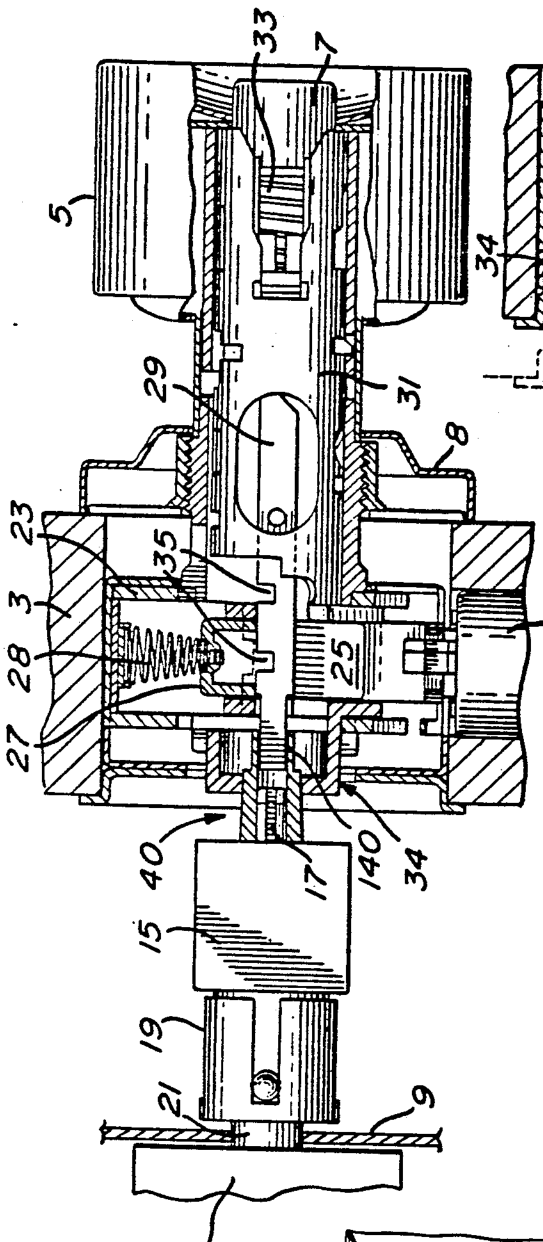
FIG. 2 is a cross-section through II—II of FIG. 1.

Turning to FIG. 2, the push-button lock 9 comprises a chamber 15 having a shaft 17 extending therethrough and out both sides of the chamber. A clutch 19, which will be more fully described below, connects the shaft 17 to the shaft 21 of outer door knob 11.

Figure 7A:
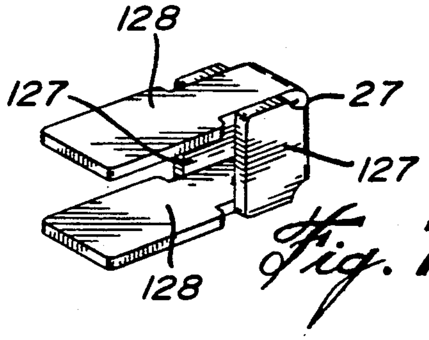
FIG. 7A is a perspective view of the U-shaped member.
Figure 7:
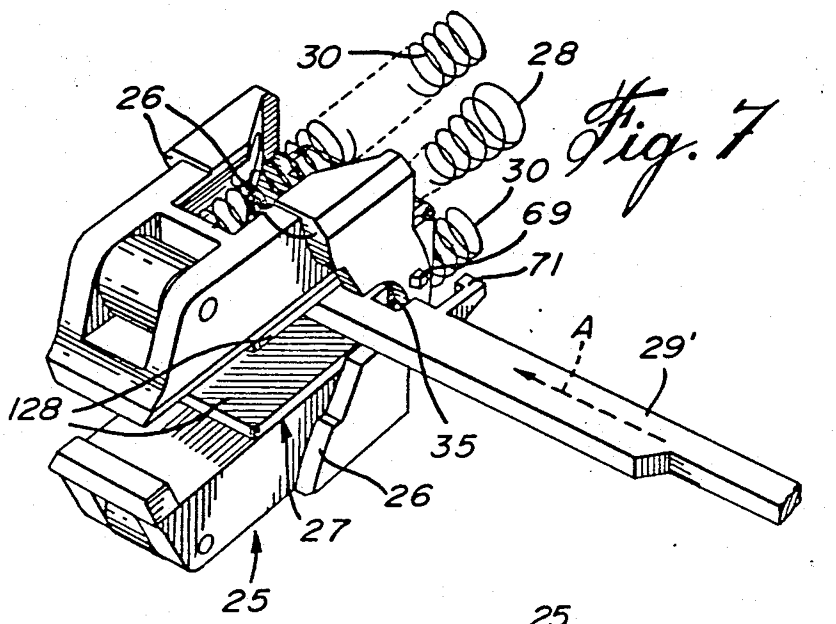
FIGS. 7, 8, 9 and 10 illustrate one embodiment of a lock-out system in accordance with the invention.

Disposed within a casing 23, which is mounted in the door, between the front and rear sides of the door, is a U-shaped latch retractor 25 which is better illustrated in FIG. 7. Disposed between the legs of the U-shaped latch retractor is a U-shaped member 27 having legs 128 and sides 127 (see FIG. 7A) whose function will be discussed below.

The U-shaped member 27 is biassed outwardly (towards the latch) by spring 28. Springs 30 (see FIG. 7), bias the latch retracting member outwardly (towards the latch edge of the door).

As is well known in the art, the inner end of the latch is disposed between the legs of the latch retractor 25 so that, when the latch retractor 25 is retracted inwardly (away from the latch edge of the door) against the force of springs 30, latch 13 is retracted so that the door can be open. When the latch retractor 25 is retracted, spring 28 will force U-shaped member 27 outwardly (towards the latch edge of the door).

When the latch retractor 25 is in its normal position (not retracted), U-shaped member 27 is maintained in its position abutting the inner side of the U-shaped latch retractor by lock rod 29 which extends through lock rod cylinder 31. As can be seen, lock rod cylinder 31 extends coaxially with the inside door knob from the inside door knob through one side of the inside door knob and into the door, and the lock rod cylinder 31 is rotatable with the door knob. Push-button 7 extends coaxially with the door knob from cylinder 31 and out of the cylinder and through the other side of the door knob. The push-button is rotatable with the cylinder.

Figure 2B:
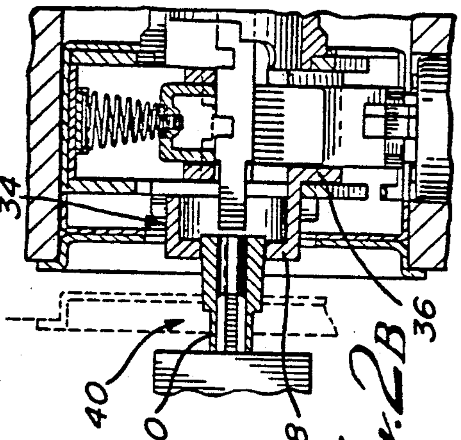
FIG. 2B is a view similar to FIG. 2 showing the connector reversed.
Figure 2A:
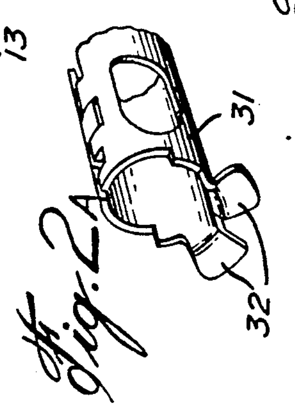
FIG. 2A is a perspective view of the lock rod cylinder of FIG. 2.

As seen in FIG. 2A, lock rod cylinder 31 has ears 32 at the inner edge thereof. When the inside door knob 5, and thereby the cylinder 31, is rotated, one of the ears 32 will engage one of the steps 26 of the U-shaped latch retractor and thereby cause the latch retractor to be retracted inwardly. Because there are two ears 32, the latch retractor will be retracted regardless of which direction the inside knob 5 is rotated. Because of this function of the cylinder, the lock rod cylinder is also referred to as a drive cylinder, in this specific case, as an inside drive cylinder.

Push-button 7 is biassed outwardly, through the other side of the inside door knob, by spring 33. Lock rod 29 is connected to push-button 7 and knob 5, so that cylinder 31, push-button 7 and lock rod 29 all rotate together.

As seen in FIG. 2, lock rod 29 includes openings 35. When the push-button, and therefore the lock rod, is pushed inwardly, the sides 127 (see FIG. 7A) of U-shaped member 27 fall into the openings 35 and are maintained there by force of spring 28. Accordingly, the push-button will remain locked in its inward position. When the inside door knob 5 is rotated, the sides 127 of U-shaped member 27 will no longer be disposed in the openings 35 so that, the push-button will be released with the inside knob rotated, and the push-button 7 will move outwardly once again, by force of spring 33, to the position illustrated in FIG. 2.

Figure 2C:
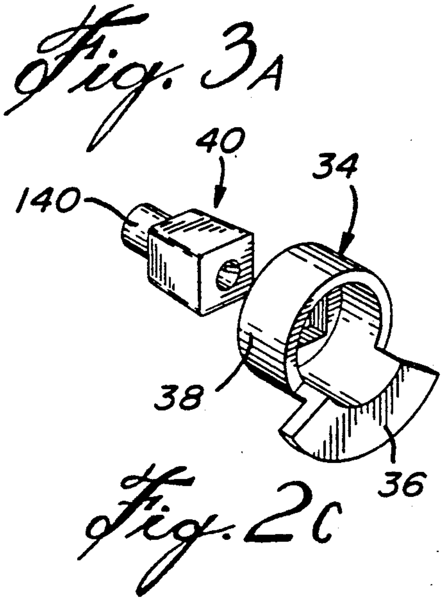
FIG. 2C is a perspective exploded view of the connector and the outside drive arrangement of FIG. 2.

As also seen in FIG. 2, shaft 17 of the chamber 15 is connected, on the right-hand side thereof, through a connector 40, to an outside drive arrangement 34. Thus, the items numbered 21, 19, 15 and 40 comprise an outside door knob drive means for driving the outside drive arrangement. As seen in FIGS. 2B and 2C, the outside drive arrangement 34 comprises a drive member having an ear 36 and a cylindrical shaft 38. The connector 40 is adaptable to different door thicknesses by changing the effective length thereof. When mounted in a relatively thin door, its shaft 140 is on the right-hand side (as in FIG. 2). When mounted in a thicker door, its shaft 140 is on the left-hand side (as in FIG. 2B), thus increasing the effective length of the arrangement by the length of the shaft.

When chamber 15 is in its unlock position (i.e., the correct combination has been inserted), shaft 17 is rotatable so that, when outside door knob 11 is rotated, the rotation force will be transmitted from the shaft 21 through the clutch 19 to shaft 17 to connector 40 and thereby to outside drive arrangement 34. Referring to FIG. 7, when the outside drive arrangement 34 is rotated, the drive member 36 will engage steps 26 of latch retractor 25 to thereby, once again, retract the latch retractor which, in turn, retracts the latch so that, once again, the door is open.

If, on the other hand, the chamber 15 is in its lock condition (the correct combination has not been inserted or the incorrect combination has been entered), then shaft 17 will not be rotatable. Under this condition, when outside door knob 11 is rotated, and shaft 21 is rotated therewith, clutch 19 will slip so that the outside door knob will rotate without rotation of the shaft 17.

Figure 4:
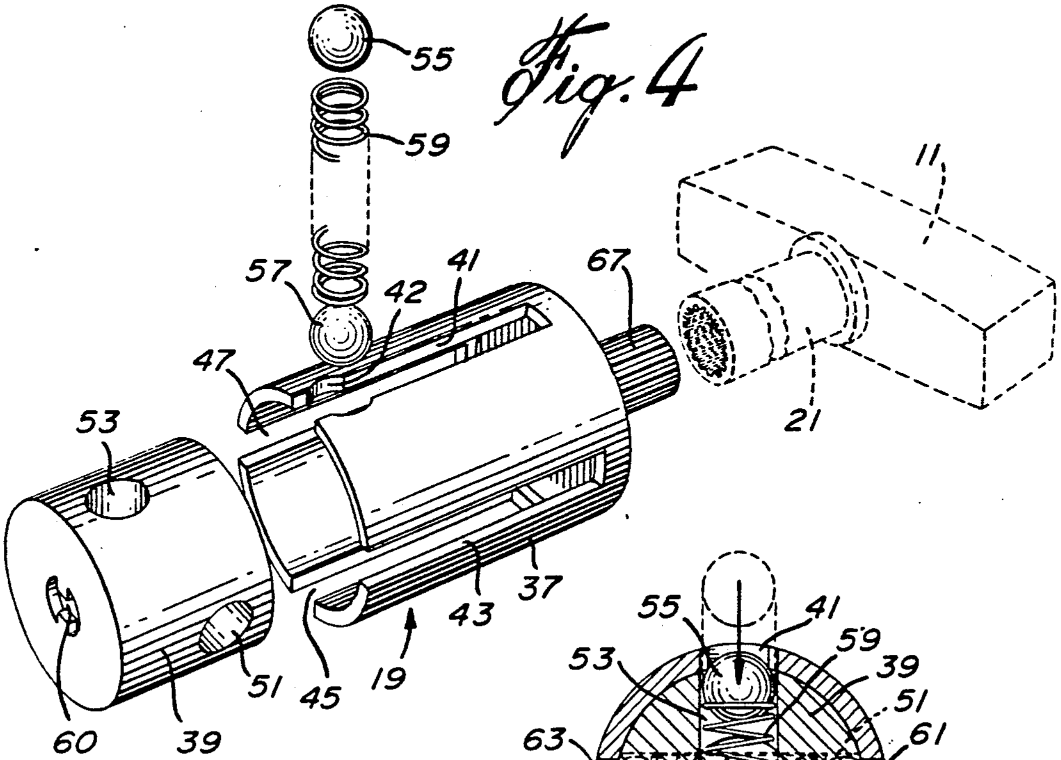
FIGS. 4, 5 and 6 illustrate the clutch of FIG. 2.
Figure 5:
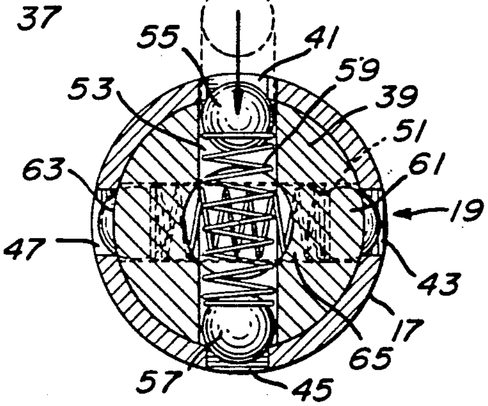
Figure 6:
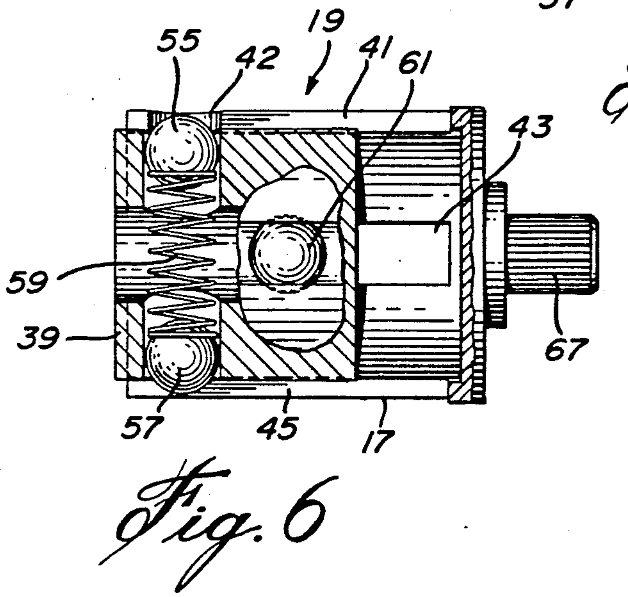

Referring now to FIGS. 4, 5 and 6, it can be seen that the clutch 19 comprises a hollow outer cylindrical drive member 37 and a solid inner cylindrical driven core 39. The hollow outer cylindrical member 37 comprises four slits 41, 43, 45 and 47 which extend longitudinally of the cylindrical member 37 and which are spaced 90 degrees apart around the periphery of the cylindrical member 37. Each of the slots 41, 43, 45 and 47 is of the same width and length.

In accordance with an improvement, one of the slots (e.g. slot 41) includes an expanded opening 42 adjacent the open end of the cylindrical member 37. The purpose of this expanded opening 42 will be discussed below.

The core member 39 includes circular openings 51 and 53 which extend diametrically through the core member 39. The direction of the circular opening 51 is transverse to the direction of the circular opening 53, and the opening 51 is at one position of the core member 39 while the opening 53 is at a second position of core member 39.

The clutch also includes ball bearings 55 and 57, spaced apart by spring 59, and ball bearings 61 and 63, spaced apart by spring 65. As can be seen, ball bearings 55 and 57 with intermediate spring 59 are disposed at opening 53 whereas ball bearings 61 and 63, with intermediate spring 65, are disposed in opening 51. Shaft 17 would be inserted into opening 60 at the outer end of the inner core member 39. The inner core member, with the ball bearings and the springs inserted, would be inserted into the outer cylinder 37 until the inner end of the inner core member 39 abuts the inner wall of the outer cylindrical member 37. The ball bearings extend partially into one of the slots 41, 43, 45 or 47. As will be quite clear, the width of each slot must be less than the diameter of the ball bearings. The diameter of the ball bearings will, of course, all be the same size.

In order to assemble a clutch which does not include the opening 42, the ball bearings and springs are inserted into their respective openings 51 and 53, and the ball bearings must be held against the force of the springs inside the inner core member 39 while the inner core member is inserted into the outer cylindrical member 37. This is a rather difficult procedure and not very easy to automate.

With the expanded opening 42, which would be greater than the diameter of the ball bearings, the assembly is made much simpler.

In assembling with the opening 42, the inner core member 39 would be rotated so that it is aligned with the opening 42, and the inner core member would then be inserted into the cylinder so that opening 53 underlies the opening 42. Ball bearing 55 would then be dropped through the opening 42 into the opening 53, spring 59 would then be inserted after which ball bearing 57 would be inserted. Ball bearing 57 is then pressed down somewhat and the inner core member 39 is pushed inwardly and rotated through 90 degrees. The inner core member continues to be pushed inwardly until opening 51 underlies opening 42. Ball bearings 61 and 63 and spring 65 are inserted into opening 51 as above, and the ball bearing 63 is then pushed down and the inner core member 39 is pushed inwardly until its inner edge abuts the inner wall of the outer cylindrical member 37. As can be seen, the assembly has been made simpler and is susceptable to automation.

In the operation of the clutch member, as the ball bearings extend into the slots, the inner core member 39 will have the tendency to rotate with the outer cylindrical member 37. When shaft 17 (which extends into opening 60) is free to rotate, and when shaft 67 is rotated, the inner core member 39 will rotate with the outer cylindrical member 37 so that shaft 17 will rotate with shaft 67. However, when shaft 17 is held against rotation (when the wrong combination has been entered or push-button 7 has been depressed for lock-out), and a rotating force is applied to shaft 67, outer cylindrical member 37 will tend to rotate while inner core member 39 will be held against rotation. The rotation force of the outer cylindrical member 37 will force ball bearings 55 and 57 inwardly towards each other against the force of the spring 59, and will force ball bearings 61 and 63 inwardly towards each other against the force of the spring 65 so that the outer cylindrical member 37 alone will rotate, i.e., the clutch will slip. Thus, returning to FIG. 2, outer door knob 11, and therefore shaft 21, will rotate without transmitting the rotation force to shaft 17 and to outside drive arrangement 34. Thus, the knob will rotate, but the door will not open.

A first embodiment of a lock-out system is illustrated in association with FIGS. 7, 8, 9 and 10. These Figures illustrate the modifications which would be made to a cylindrical lock, for example, of the kind illustrated in FIGS. 1 and 2, in order to implement the lock-out system of the first embodiment.

In accordance with the invention, the U-shaped latch retractor 25 is modified by including thereon a stud 69 on the inside door side of the latch retractor. The locking rod, referenced in FIGS. 7 to 10 at 29', is modified by including thereon an L-shaped member 71. The modified lock rod 29' would extend through the lock rod cylinder 31 in the same way as lock rod 29 does in FIG. 2. Additionally, the U-shaped latch retractor 25 would be encased in the casing 23 in the same way as it is in FIG. 2. Thus, FIG. 2 illustrates the environment of the inventive lock-out system, while FIGS. 7 to 10 illustrate the specific details thereof.

In operation, when push-button 7 is pushed in, lock rod 29' moves leftwardly in the direction of the arrow A in FIG. 7. It will then assume the position illustrated in solid lines in FIGS. 8 and 9, i.e., the leg of the L-shaped member will be disposed behind the stud 69. Once again, the lock rod will be locked into its pushed-in position when the legs of the U-shaped member 27 fall into the openings 35 of the lock rod.

When the outside door knob is now rotated, and drive member 36 attempts to retract the U-shaped latch retractor 25 in the direction of arrow C, such retractive motion will be prevented because the motion of the stud 69 is blocked by the leg of the L-shaped member 71. This again will force clutch 19 to slip. Accordingly, the door cannot be opened from the outside.

Figure 8:
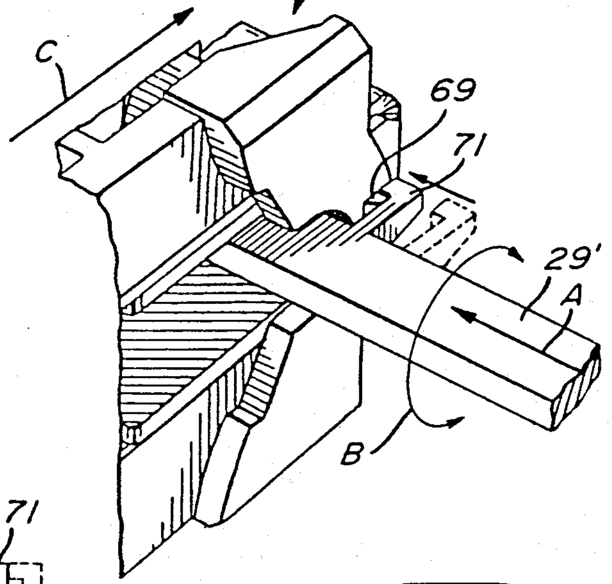
Figure 9:
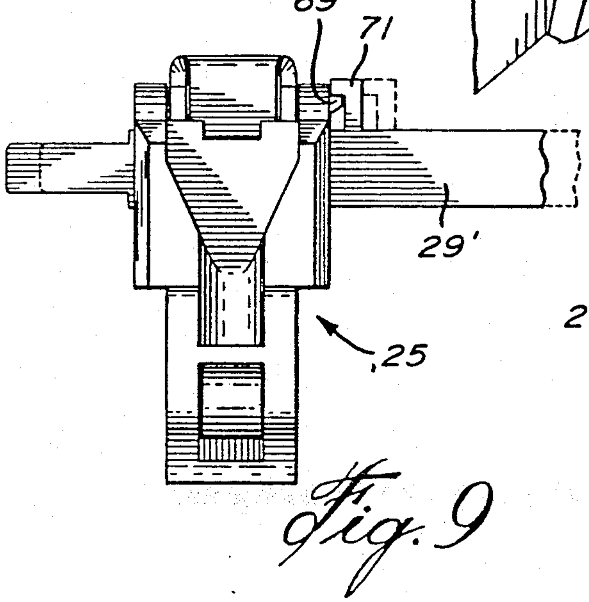
Figure 10:
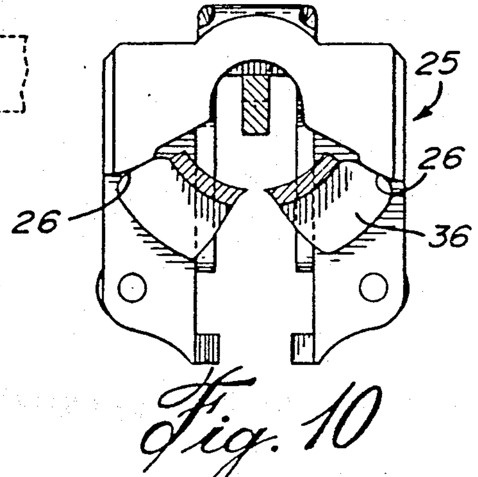

If, on the other hand, inside door knob 5 is rotated in the direction of arrow B, lock rod 29' will also rotate, in the direction of arrow B of FIG. 8, so that the leg of the L-shaped member will move out of the way of the stud 69, and U-shaped latch retractor 25 will be retracted in the direction of arrow C of FIG. 8. Accordingly, the door can be opened from the inside. At the same time, lock rod 29' will be released so that the push-button will move outwardly due to the action of spring 33 as above-described.

Figure 11:
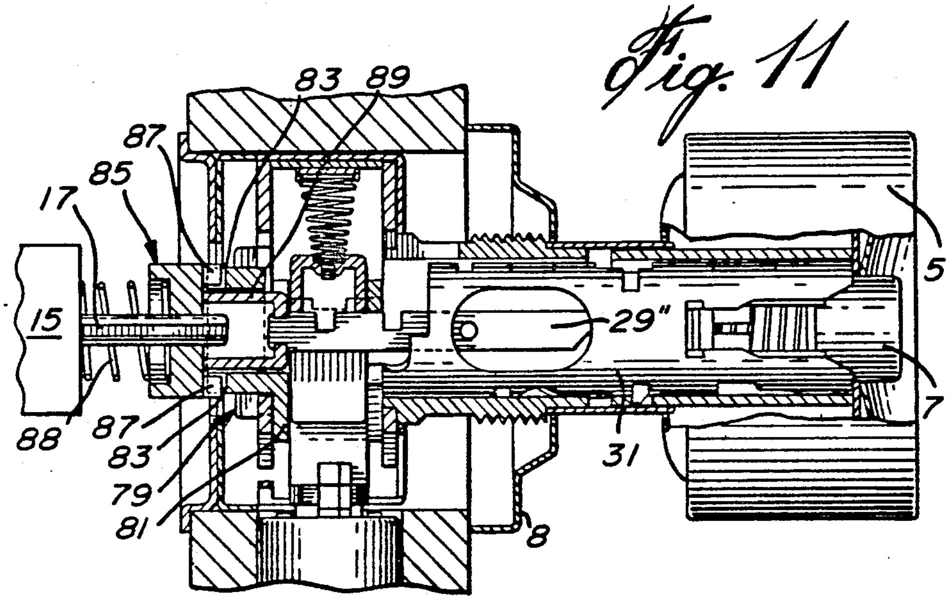
FIGS. 11, 12 and 13 illustrate a second embodiment of a lock-out system in accordance with the invention.
Figure 13:
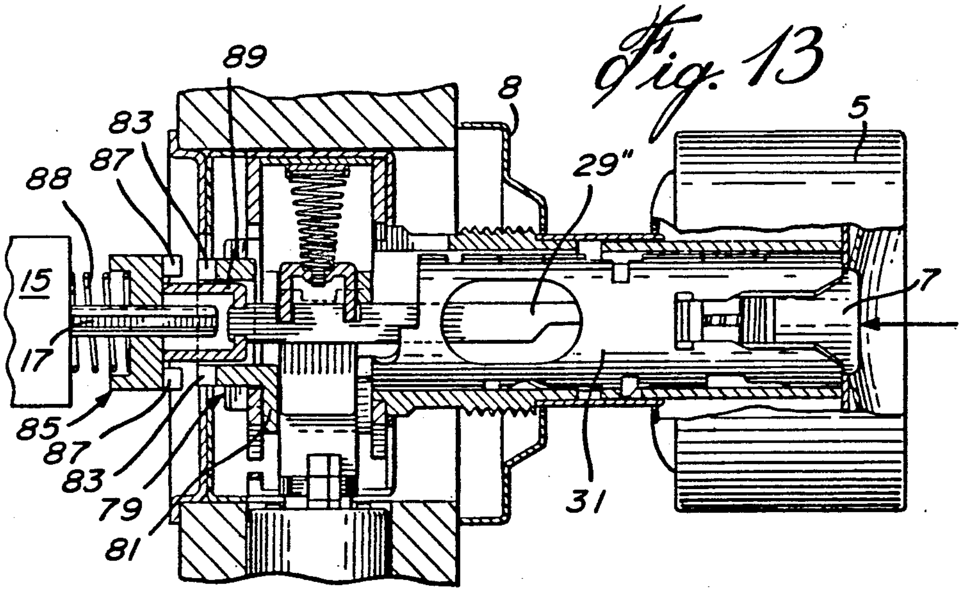
Figure 12:
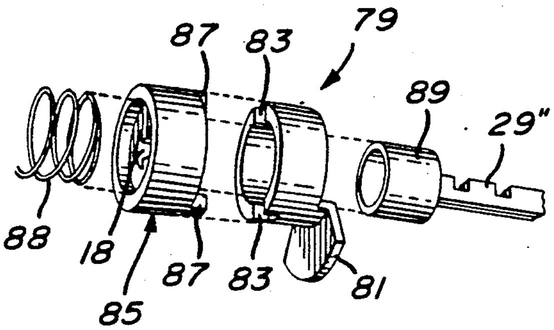

A second embodiment of a lock rod system in accordance with the invention is illustrated in FIGS. 11, 12 and 13. In this embodiment the inside door arrangement is the same as in FIG. 2.

The outside drive arrangement 34 of FIG. 2 is replaced with the outside sleeve drive 79 illustrated in FIGS. 11, 12 and 13. The outside sleeve drive 79 includes an ear 81 and slots 83.

Attached to shaft 17, through opening 18, is a lock-out cam 85 having prongs 87 and biassed inwardly by spring 88.

The lock rod 29 is modified by including at the free end thereof a freely rotating cup ring 89. The cup ring 89 abuts the lock-out cam 85 as seen in FIG. 11.

Once again, push-button 7 rotates with inside door knob 5, and lock rod 29 rotates with push-button 7, so that lock-out rod 29 rotates with inside door knob 5.

Lock-out cam 85 rotates with shaft 17, and prongs 87 of lock-out cam 85 extend into slot 83 when the push-button is not pushed in as seen in FIG. 11. Accordingly, when the correct combination has been inserted into the chamber 15 of permutation lock 9, and when outside door knob 11 is rotated, lock-out cam 85 will also rotate to rotate, in turn, outside sleeve drive 79. Ear 81 will engage either one of the steps 26 to retract U-shaped latch retractor 25 so that the door will be open.

When push-button 7 is pushed in, as shown in FIG. 13, cup ring 89 pushes lock-out cam leftwardly so that prongs 87 are no longer in slot 83. Accordingly, there is no longer any connection between the outside door knob 11 and the outside sleeve drive 79. Thus, when outside door knob 11 is rotated under the above conditions, although the door knob will rotate, the U-shaped latch retractor will not be retracted and the door will not open. Thus, the door cannot be opened from the outside under these conditions even when the correct combination has been inserted into the permutation lock.

Figure 3:
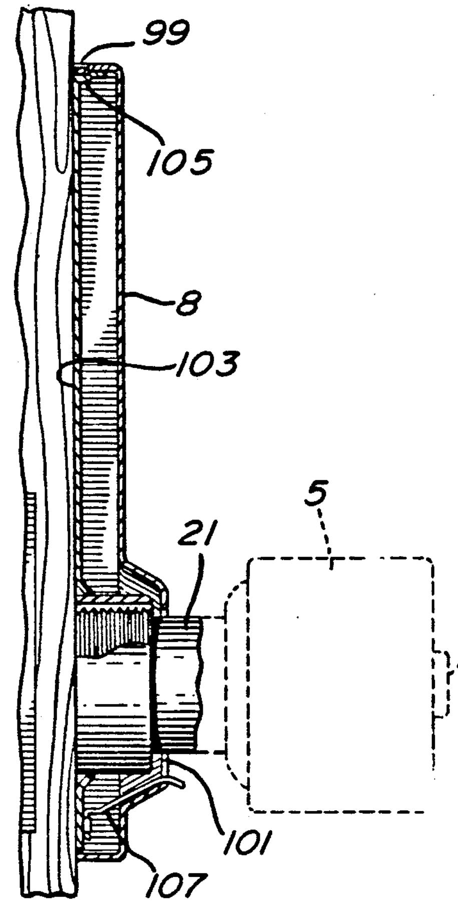
FIG. 3 is a cross-section to illustrate the cover arrangement.
Figure 3A:
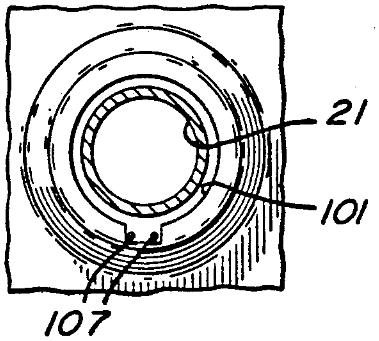
FIGS. 3A and 3B illustrate two different types of openings for the cover arrangement.
Figure 3B:
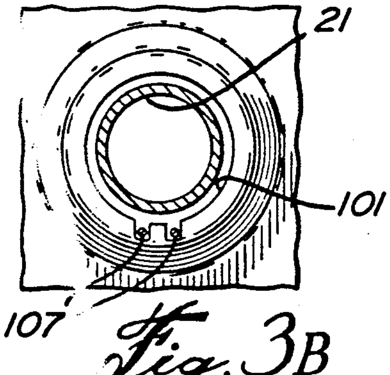

A cover arrangement for a lock or the like in accordance with the invention is illustrated in FIGS. 1 and 3. Referring to these Figures, the cover arrangement comprises a cover member 8 having indents 99 at the top end thereof. Preferably, there are two such indents equally spaced from the side edges of the cover member. The cover member also has a bottom opening 101. Different shapes for the opening are shown in FIGS. 3A and 3B. Obviously, other shapes could also be used.

Referring to FIG. 3, the cover arrangement also includes a door mounted plate 103 which has openings 105 which are aligned with the indents 99. A spring 107 is mounted on the plate 103 and is adapted to extend from the plate member and outwardly of the cover member 8 through the opening 101 thereof.

In operation, the cover member is placed over the plate top end first so that the indents 99 extend into the openings 105. The bottom end is then pivoted so that the spring 107 extends out through the opening 101. (It will of course be appreciated that the cover member is mounted on the plate before the inside door knob 5 is mounted.)

The force of the spring will maintain the cover arrangement closed against removal by application of a small force which might be applied, for example, by a child. However, applying enough force to overcome the holding power of the spring, which could easily be applied by an adult, will serve to remove the cover member from the plate.

Although several embodiments have been described, this was for the purpose of illustrating, but not limiting, the invention. Various modifications, which will come readily to the mind of one skilled in the art, are within the scope of the invention as defined in the appended claims.

We claim:

1. A permutation lock arrangement comprising:

a permutation lock chamber having a chamber shaft extending therethrough, said chamber shaft being held against rotation when the chamber is in a locked condition and said chamber shaft being rotatable when said chamber is in an unlocked condition;

an outer door handle having an outer handle shaft extending therefrom and rotatable therewith;

clutch means connecting said outer door handle shaft and said chamber shaft;

whereby, when said chamber is in its unlocked condition and said outer door handle is rotated, said clutch means engages and said chamber shaft rotates with said outer door handle shaft; and when said chamber is in its locked condition, and the outer door handle is rotated, said clutch means slips to permit rotation of said outer door handle shaft without rotation of said chamber shaft;

said clutch means being connectable to said chamber outer door handle shaft at one end thereof and to said chamber shaft at one end thereof, said clutch means engaging to rotate said chamber shaft with said outer door handle shaft when said chamber shaft is not held against rotation, said clutch means slipping to permit rotation of said outer door handle shaft without rotation of said chamber shaft when said chamber shaft is held against rotation;

said clutch means comprising:

a hollow cylindrical member having a closed end and an open end, a plurality of slots of equal length and width extending from said open end and longitudinally of said cylindrical member and spaced 90° from each other around the periphery of said cylindrical member, said outer door handle shaft being connectable at said closed end of said cylindrical member;

a solid cylindrical inner core member insertable into said open end of said hollow cylindrical member, from a first end thereof, and having a first opening extending diametrically through said core transverse to the longitudinal axis thereof at a first position of said core member, and a second opening, at a second position of said core member, extending diametrically through said core member transverse to both said first opening and the longitudinal axis of said core member;

a first ball bearing at one end of said first opening and a second ball bearing at the other end of said first opening and a first spring between said first and second ball bearings urging said ball bearings away from each other towards said hollow cylindrical member;

a third ball bearing at one end of said second opening and a fourth ball bearing at the other end of said second opening and a second spring between said third and fourth ball bearings urging said third and fourth ball bearings away from each other towards said hollow cylindrical member;

the diameters of said ball bearings all being of equal size and being greater than the width of said slots; and the second end of said solid cylindrical inner core member being connected to said chamber shaft.

2. A lock arrangement as defined in claim 1 wherein said plurality of slots comprises four slots.

3. A clutch connectable to a first shaft at one end thereof and to a second shaft at the other end thereof, said clutch engaging to rotate said second shaft with said first shaft when said second shaft is not held against rotation, said clutch slipping to permit rotation of said first shaft without rotation of said second shaft when said second shaft is held against rotation;

said clutch comprising:

a hollow outer cylindrical member having a closed end and an open end, four slots, of equal length and width, extending from said open end and longitudinally of said cylindrical member and spaced 90 degrees from each other around the periphery of said cylindrical member, said first shaft being connectable at said closed end of said cylindrical member;

a solid cylindrical inner core member insertable into said hollow cylindrical member, from a first end thereof, and having a first opening extending diametrically through said core member transverse to the longitudinal axis thereof at a first position of said core member, and a second opening extending diametrically through said core member transverse to both said first opening and the longitudinal axis of said core member;

a first ball bearing at one end of said first opening and a second ball bearing at the other end of said first opening and a first spring between said first and second ball bearings urging said ball bearings away from each other towards said hollow cylindrical member;

a third ball bearing at one end of said second opening and a fourth ball bearing at the other end of said second opening and a second spring between said third and fourth ball bearings urging said third and fourth ball bearings away from each other towards said hollow cylindrical member;

the diameters of said ball bearings all being of equal size and being greater than the width of said slots;

an expanded opening at the end of one of said slots adjacent the open end of said hollow cylindrical member, said expanded opening being large enough to permit the passage of a ball bearing therethrough;

whereby to facilitate the loading of said ball bearings and springs during assembly of said clutch.

* * * * *